(12) United States Patent
Rose et al.

(10) Patent No.: US 10,107,101 B2
(45) Date of Patent: Oct. 23, 2018

(54) METHOD TO REPAIR VARIABLE VANES

(71) Applicant: UNITED TECHNOLOGIES CORPORATION, Hartford, CT (US)

(72) Inventors: William M. Rose, Warren, MA (US); Stephen P. Sullivan, Suffield, CT (US)

(73) Assignee: United Technologies Corporation, Farmington, CT (US)

( * ) Notice: Subject to any disclaimer, the term of this patent is extended or adjusted under 35 U.S.C. 154(b) by 342 days.

(21) Appl. No.: 14/900,680

(22) PCT Filed: Jun. 26, 2014

(86) PCT No.: PCT/US2014/044224
§ 371 (c)(1),
(2) Date: Dec. 22, 2015

(87) PCT Pub. No.: WO2015/006056
PCT Pub. Date: Jan. 15, 2015

(65) Prior Publication Data
US 2016/0130946 A1    May 12, 2016

Related U.S. Application Data

(60) Provisional application No. 61/845,386, filed on Jul. 12, 2013.

(51) Int. Cl.
*B23P 6/00* (2006.01)
*F01D 5/00* (2006.01)
(Continued)

(52) U.S. Cl.
CPC .......... *F01D 5/005* (2013.01); *B23K 15/0006* (2013.01); *B23K 15/0093* (2013.01);
(Continued)

(58) Field of Classification Search
CPC ........ F01D 5/005; F01D 9/042; F01D 17/162; F05D 2230/80; F04D 29/563; B23P 6/005
See application file for complete search history.

(56) References Cited

U.S. PATENT DOCUMENTS 5,269,057 A    12/1993   Mendham
5,348,212 A     9/1994   Galanes
(Continued)

FOREIGN PATENT DOCUMENTS

EP     1892422 A1    2/2008
FR     2874977 A1    3/2006
(Continued)

OTHER PUBLICATIONS

Int'l Search Report for corresponding PCT application—PCT/US2014/044224.
(Continued)

*Primary Examiner* — Ninh H Nguyen
(74) *Attorney, Agent, or Firm* — Carlson, Gaskey & Olds, P.C.

(57) ABSTRACT

A variable vane having an airfoil, an inner trunnion shaft and an outer trunnion shaft, with the outer trunnion shaft having a threaded hole and a groove extending around a circumference of the outer trunnion shaft is repaired by removing a portion of the outer trunnion shaft leaving a shaft stub. A repair detail is prepared having an outer peripheral shaft portion with a nominal outer diameter. The repair detail further has a pilot portion extending forwardly and having a smaller outer diameter than an outer diameter of the nominal outer diameter. The shaft stub has a remaining bore portion, which is a portion of the threaded hole. The pilot portion is sized to be received within the remaining bore portion. The
(Continued)

pilot is inserted into the remaining bore portion. The repair detail is welded to the shaft stub. A repaired variable vane is also disclosed.

19 Claims, 3 Drawing Sheets

(51) Int. Cl.
  *B23K 15/00* (2006.01)
  *B23K 26/32* (2014.01)
  *F01D 17/16* (2006.01)
  *F01D 25/28* (2006.01)
  *F04D 29/56* (2006.01)
  *B23K 101/00* (2006.01)

(52) U.S. Cl.
  CPC .............. *B23K 26/32* (2013.01); *B23P 6/002* (2013.01); *B23P 6/005* (2013.01); *F01D 17/162* (2013.01); *F01D 25/285* (2013.01); *F04D 29/563* (2013.01); *B23K 2201/001* (2013.01); *F05D 2230/233* (2013.01); *F05D 2230/80* (2013.01)

(56) References Cited

U.S. PATENT DOCUMENTS

| | | |
|---|---|---|
| 5,444,911 A | 8/1995 | Goodwater et al. |
| 5,490,322 A | 2/1996 | Goodwater et al. |
| 5,517,817 A * | 5/1996 | Hines .................... F01D 17/162 415/115 |
| 5,873,700 A | 2/1999 | Ichikawa |
| 7,614,848 B2 | 11/2009 | Bogue et al. |
| 7,722,318 B2 * | 5/2010 | Addis ..................... B23P 6/005 415/148 |
| 8,206,090 B2 | 6/2012 | Cloarec |
| 9,004,850 B2 * | 4/2015 | Nichols ................... F01D 5/141 415/1 |
| 2002/0076321 A1 | 6/2002 | Nicolson et al. |
| 2006/0228211 A1 | 10/2006 | Vance et al. |
| 2006/0245916 A1 | 11/2006 | Foucher |
| 2010/0284793 A1 | 11/2010 | Lee et al. |
| 2011/0110783 A1 | 5/2011 | Addis et al. |

FOREIGN PATENT DOCUMENTS

| | | | |
|---|---|---|---|
| GB | 2533322 A * | 6/2016 | ............. B23K 20/12 |
| JP | 2006307856 A | 11/2006 | |
| JP | 2008172900 A | 7/2008 | |

OTHER PUBLICATIONS

Supplementary European Search Report for European Application No. 14823870.2 dated Feb. 13, 2017.
Singapore Search Report for Singapore Application 11201509986S completed Apr. 21, 2016.
International Preliminary Report on Patentability for International Application No. PCT/US2014/044224 dated Jan. 21, 2016.

* cited by examiner

METHOD TO REPAIR VARIABLE VANES

CROSS-REFERENCE TO RELATED APPLICATIONS

This application claims priority to U.S. Provisional Application No. 61/845,386, filed Jul. 12, 2013.

BACKGROUND

This application relates to a method to repair a variable vane for use in a gas turbine engine.

Gas turbine engines typically include a fan delivering air into a core engine and further outward of the core engine as bypass flow for propulsion. The air delivered in the core engine passes into a compressor section where it is compressed by compressor rotors, having blades, and delivered into a combustion section. The compressed air is mixed with fuel and ignited in the combustion section and products of this combustion pass downstream across turbine rotors driving them to rotate.

Typically, there are several stages of compression across the compressor rotors. The stages each include a plurality of rotating blades. It is known to position vanes intermediate the rows of blades to properly condition the air flow heading downstream toward the next row of blades. One type of vane is a variable vane. The variable vane is positioned such that an associated airfoil is received at distinct angles dependent on different conditions of operation of the gas turbine engine. Typically, an actuator drives the airfoils of the variable vanes to rotate to change the angle.

Variable vanes typically have an inner trunnion and an outer trunnion, with the outer trunnion being driven by the actuator. The variable vanes wear with use and any number of locations on a variable vane may require repair.

While many areas on the vane are relatively easy to repair, other areas have been difficult to repair and have resulted in the damaged vane being discarded.

SUMMARY

In a featured embodiment, a method of repairing a variable vane having an airfoil, an inner trunnion shaft and an outer trunnion shaft, with the outer trunnion shaft having a threaded hole and a groove extending around a circumference of the outer trunnion shaft, includes the steps of removing a portion of the outer trunnion shaft at a location between the airfoil and the groove leaving a shaft stub. A repair detail is prepared having an outer peripheral shaft portion with a nominal outer diameter. The repair detail further has a pilot portion extending forwardly and having a smaller outer diameter than an outer diameter of the nominal outer diameter. The shaft stub has a remaining bore portion, which is a portion of the threaded hole. The pilot portion is sized to be received within the remaining bore portion. The pilot is inserted into the remaining bore portion. The repair detail is welded to the shaft stub.

In another embodiment according to the previous embodiment, the repair detail is drilled to form a new threaded hole, and to remove the pilot from the remaining bore portion.

In another embodiment according to any of the previous embodiments, a groove and slot are formed in the repair detail.

In another embodiment according to any of the previous embodiments, the repair detail is formed with a pilot hole that extends through the repair detail, but is of a smaller diameter than the remaining bore portion.

In another embodiment according to any of the previous embodiments, the welding is electron beam welding.

In another embodiment according to any of the previous embodiments, a repaired variable vane is inserted into a variable vane system within a gas turbine engine.

In another embodiment according to any of the previous embodiments, a groove and slot are formed in the repair detail.

In another embodiment according to any of the previous embodiments, the repair detail is formed with a pilot hole that extends through the repair detail, but is of a smaller diameter than the remaining bore portion.

In another embodiment according to any of the previous embodiments, the welding is electron beam welding.

In another embodiment according to any of the previous embodiments, a repaired variable vane is inserted into a variable vane system within a gas turbine engine.

In another embodiment according to any of the previous embodiments, the repair detail is formed with a pilot hole that extends through the repair detail, but is of a smaller diameter than the remaining bore portion.

In another embodiment according to any of the previous embodiments, the welding is electron beam welding.

In another embodiment according to any of the previous embodiments, a repaired variable vane is inserted into a variable vane system within a gas turbine engine.

In another embodiment according to any of the previous embodiments, the welding is electron beam welding.

In another embodiment according to any of the previous embodiments, a repaired variable vane is inserted into a variable vane system within a gas turbine engine.

In another embodiment according to any of the previous embodiments, a repaired variable vane is inserted into a variable vane system within a gas turbine engine.

In another featured embodiment, a method of repairing a variable vane having an airfoil, an inner trunnion shaft and an outer trunnion shaft, with the outer trunnion shaft having a threaded hole and a groove extending around a circumference of the outer trunnion shaft, includes the steps of removing a portion of the outer trunnion shaft at a location between the airfoil and the groove leaving a shaft stub. A repair detail is prepared having an outer peripheral shaft portion with a nominal outer diameter. The repair detail further has a pilot portion extending forwardly and having a smaller outer diameter than an outer diameter of the nominal outer diameter. The shaft stub has a remaining bore portion, which is a portion of the threaded hole. The pilot is sized to be received within the remaining bore portion. The pilot is inserted into the remaining bore portion. The repair detail is welded to the shaft stub. The repair detail is drilled to form a new threaded hole, and to remove the pilot from the remaining bore portion, forming a groove and slot in the repair detail. The repaired variable vane is inserted into a variable vane system within a gas turbine engine.

In another embodiment according to the previous embodiment, the repair detail is formed with a pilot hole that extends through the repair detail, but is of a smaller diameter than the remaining bore portion.

In another embodiment according to any of the previous embodiments, the welding is electron beam welding.

In another featured embodiment, a repaired variable vane has an airfoil, inner trunnion shaft, and an outer trunnion shaft. The outer trunnion shaft is formed of two portions that are welded together. A first of the two portions extends away from a second of the two portions in a direction away from the airfoil. A groove and a slot are formed in the second of the two portions.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

These and other features may be best understood from the following drawings and specification.

DETAILED DESCRIPTION

Figure 1:
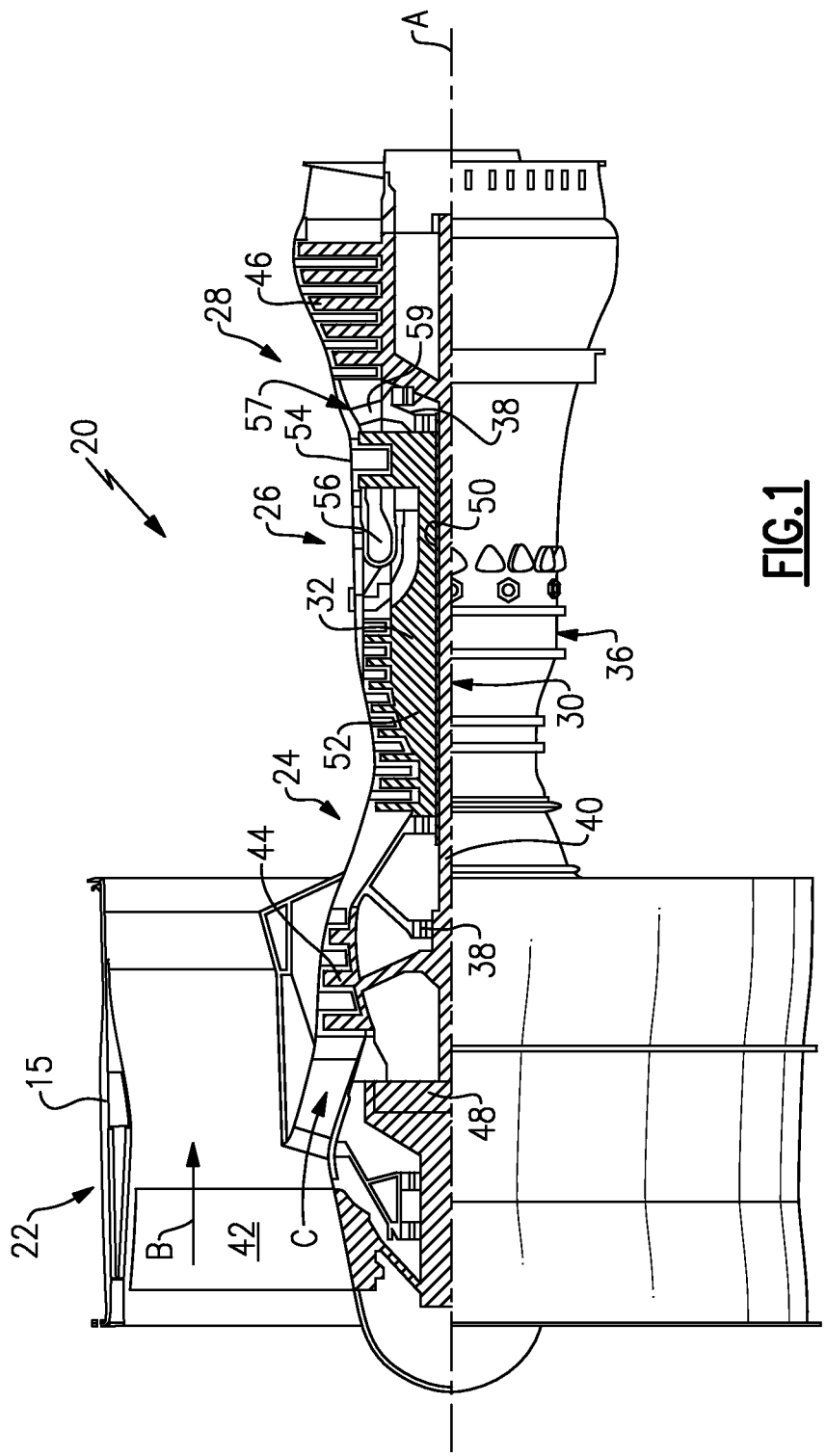
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
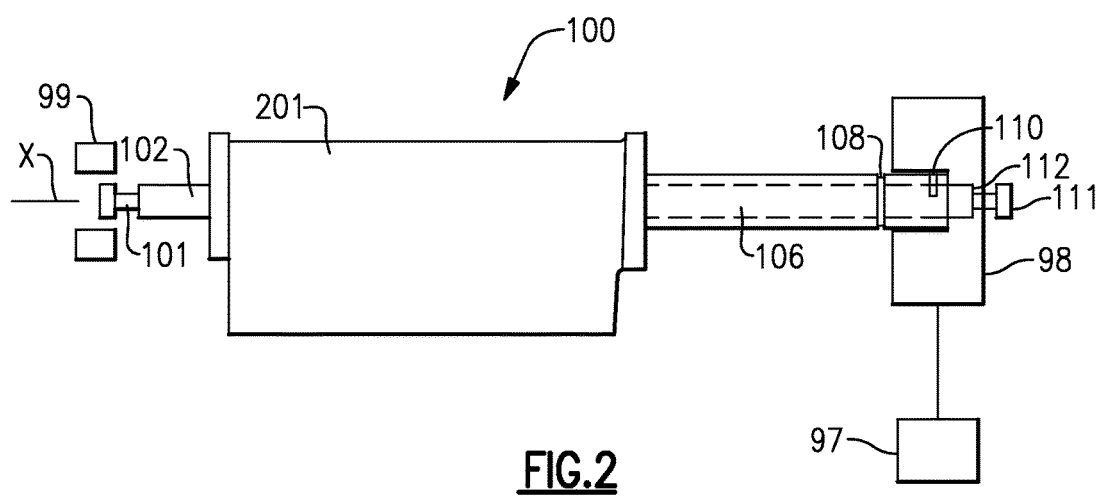
FIG. 2 shows a variable vane.

FIG. 2 shows a variable vane 100 which may be positioned between the blades in successive compressor rotor stages. An inner trunnion shaft 102 is supported in a support bearing 99. An outer trunnion shaft 106 is supported in an outer trunnion support 98 and is driven by an actuator 97 to pivot and change an angle of an airfoil 201. This structure is known, and is shown schematically. Typically, the angle of the airfoil 201 about a pivot axis X is changed during different periods of operation of the engine.

For purposes of this application, the terms "inner" and "outer" do not limit the location to radially inner or outer positioning. Rather, the term "outer" can be taken to be the end actually driven by the actuator 97. That is, while most variable vanes 100 are driven by a radially outer actuator, there are also variable vanes which may be driven by a radially inner actuator, and for such systems, the term "outer" would refer to the radially inner trunnion which is associated with the actuator.

A retaining tab 101 is associated with the inner trunnion 102. These can be repaired if broken, damaged or worn. The outer trunnion shaft 106 may also be easily repaired if damaged or worn.

A slot 110 associated with the outer trunnion 106 may also be repaired easily. However, a groove 108 in the outer trunnion is not easily repaired. Further, if a threaded hole 112 is damaged or has worn threads, it is not easily repaired. If a bolt breaks in the threaded hole 112, this may be repaired. However, damage to the threads or worn threads for the threaded hole 112 cannot be repaired easily. It should be understood the threaded hole 112 receives a bolt, shown schematically at 111 to secure the support 98 to the outer trunnion 106.

Figure 3A:
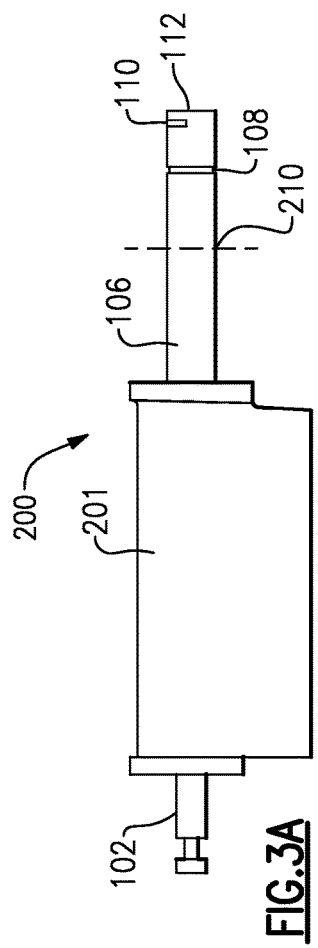
FIG. 3A shows a first repair step.

When the groove 108 or threaded hole 112 require repair, FIG. 3A-3E graphically present the steps of a method. As shown in FIG. 2A, initially damage is identified to either the groove 108 or the threaded hole 112. A cutoff point 210 on the outer trunnion shaft 106 is identified as shown in FIG. 3A. The outer trunnion shaft 106 is cut at the point 210, and the portion of the shaft outwardly of the cut point may be discarded.

Figure 3C:
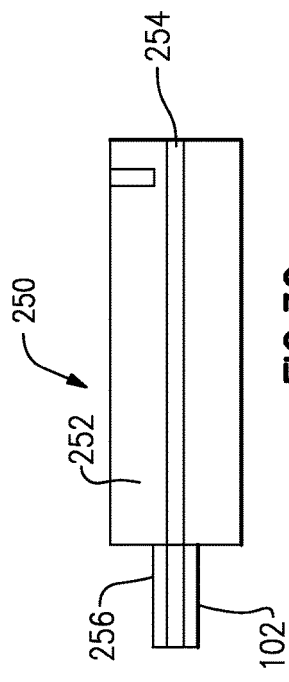
FIG. 3C shows a subsequent step.
Figure 3D:
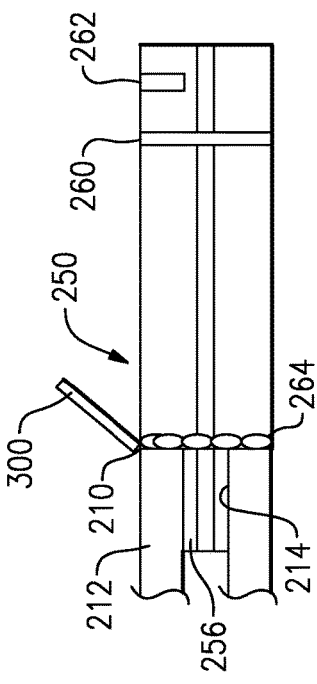
FIG. 3D shows yet another subsequent step.
Figure 3B:
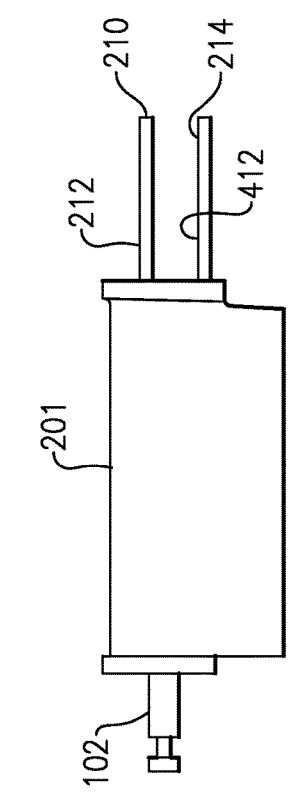
FIG. 3B shows a subsequent repair step.

As shown in FIG. 3C, a repair detail 250 is prepared having a body 252 which may have an outer periphery approximately equal to the outer periphery of the outer trunnion shaft 106 or the outer trunnion shaft stub 212 remaining after the cutoff at point 210. As shown at 214, a portion 412 of the original threaded hole 122 (see FIG. 3A) extends into the stub 212. The repair detail 250 further has a pilot hole 254 and a pilot 256 for alignment. The pilot 256 is inserted into the bore portion 214 and is clamped. The pilot provides support for proper alignment of the repair detail 250 relative to the stub 212. As shown in FIG. 3D, the two parts are clamped together and an electron beam weld 300 is applied, depositing weld material 264 between the two components. Of course, alternative welding techniques, such as gas tungsten arc welding or laser welding, among others, may be used.

In addition, the groove 260 and the slot 262 may be machined into the detail 250.

Figure 3E:
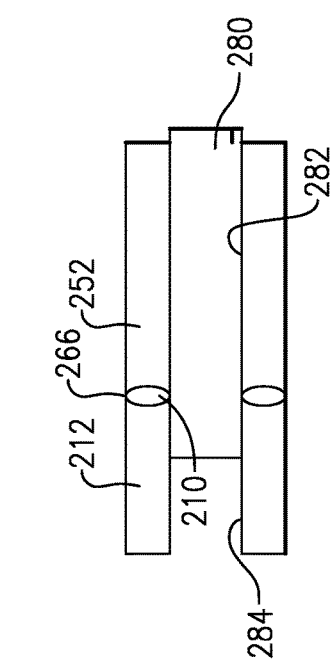
FIG. 3E shows a final step.

As shown in FIG. 3E, a drill 280 is then inserted by beginning in the pilot hole 254 and drilling through the entire body 252 of the repair detail 250. Further, the drill 280 drills further and removes the pilot 256, such that a bore portion 284 in the stub 212 is of the same diameter as the bore 282. As shown, a portion 266 of the weld joint remains.

What remains is a repaired variable vane much like that shown at 100 in FIG. 2.

The repaired variable vane is then reinserted into a variable vane drive system, such as including mounts 38, and support bearings 99, and within a gas turbine engine.

In general, the variable vane 100 has an airfoil 201, an inner trunnion shaft 102 and an outer trunnion shaft 106. The outer trunnion shaft 106 has a threaded hole 112 and a groove 108 extending around a circumference of the outer trunnion shaft. The repair method removes a portion of the outer trunnion shaft 106 at a location 210 between the airfoil 201 and groove 108 leaving a shaft stub. A repair detail 250 has an outer peripheral shaft portion with a nominal outer diameter. The repair detail 250 further has a pilot portion 256 extending forwardly and having a smaller outer diameter than an outer diameter of a nominal outer diameter. The shaft stub has a remaining bore portion 214, which is a portion of the threaded hole 112. The pilot portion 256 is sized to be received within the remaining bore portion 214. The inserting pilot portion 256 is inserted into the remaining bore portion 214, and the repair detail 250 is welded to the shaft stub.

The repaired variable vane includes an airfoil 201, inner trunnion shaft 102, and an outer trunnion shaft 108. The outer trunnion shaft is formed of two portions which are welded together 264. A first 250 of the two portions extends away from a second 212 of the two portions in a direction away from the airfoil 201. A groove 260, and a slot 262 are formed in the first 250 of the two portions.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of repairing a variable vane having an airfoil, an inner trunnion shaft and an outer trunnion shaft, with said outer trunnion shaft having a threaded hole and a groove extending around a circumference of the outer trunnion shaft, comprising the steps of:
removing a portion of said outer trunnion shaft at a location between said airfoil and said groove leaving a shaft stub;
preparing a repair detail, said repair detail having an outer peripheral shaft portion with a nominal outer diameter, with said repair detail further having a pilot portion extending forwardly and having a smaller outer diameter than an outer diameter of said nominal outer diameter, with said shaft stub having a remaining bore portion, which is a portion of said threaded hole and with said pilot being sized to be received within said remaining bore portion; and
inserting said pilot into said remaining bore portion, and welding said repair detail to said shaft stub.

2. The method as set forth in claim 1, further including the step of drilling into said repair detail to form a new threaded hole, and to remove said pilot from said remaining bore portion.

3. The method as set forth in claim 2, further including the step of forming a groove and slot in the repair detail.

4. The method as set forth in claim 3, wherein said repair detail is formed with a pilot hole that extends through said repair detail, but is of a smaller diameter than said remaining bore portion.

5. The method as set forth in claim 4, wherein said welding is electron beam welding.

6. The method as set forth in claim 5, wherein a repaired variable vane is inserted into a variable vane system within a gas turbine engine.

7. The method as set forth in claim 1, further including the step of forming a groove and slot in the repair detail.

8. The method as set forth in claim 7, wherein said repair detail is formed with a pilot hole that extends through said repair detail, but is of a smaller diameter than said remaining bore portion.

9. The method as set forth in claim 8, wherein said welding is electron beam welding.

10. The method as set forth in claim 9, wherein a repaired variable vane is inserted into a variable vane system within a gas turbine engine.

11. The method as set forth in claim 1, wherein said repair detail is formed with a pilot hole that extends through said repair detail, but is of a smaller diameter than said remaining bore portion.

12. The method as set forth in claim 11, wherein said welding is electron beam welding.

13. The method as set forth in claim 12, wherein a repaired variable vane is inserted into a variable vane system within a gas turbine engine.

14. The method as set forth in claim 1, wherein said welding is electron beam welding.

15. The method as set forth in claim 14, wherein a repaired variable vane is inserted into a variable vane system within a gas turbine engine.

16. The method as set forth in claim 1, wherein a repaired variable vane is inserted into a variable vane system within a gas turbine engine.

17. A method of repairing a variable vane having an airfoil, an inner trunnion shaft and an outer trunnion shaft, with said outer trunnion shaft having a threaded hole and a groove extending around a circumference of the outer trunnion shaft, comprising the steps of:
    removing a portion of said outer trunnion shaft at a location between said airfoil and said groove leaving a shaft stub;
    preparing a repair detail, said repair detail having an outer peripheral shaft portion with a nominal outer diameter, with said repair detail further having a pilot portion extending forwardly and having a smaller outer diameter than an outer diameter of said nominal outer diameter, with said shaft stub having a remaining bore portion, which is a portion of said threaded hole and with said pilot being sized to be received within said remaining bore portion;
    inserting said pilot into said remaining bore portion, and welding said repair detail to said shaft stub;
    drilling into said repair detail to form a new threaded hole, and to remove said pilot from said remaining bore portion, forming a groove and slot in the repair detail; and
    inserting the repaired variable vane into a variable vane system within a gas turbine engine.

18. The method as set forth in claim 17, wherein said repair detail is formed with a pilot hole that extends through said repair detail, but is of a smaller diameter than said remaining bore portion.

19. The method as set forth in claim 17, wherein said welding is electron beam welding.

* * * * *